United States Patent [19]

Weder et al.

[11] Patent Number: 5,715,650
[45] Date of Patent: *Feb. 10, 1998

[54] FLOWER POT COVER WITH CRIMPED SKIRT

[75] Inventors: Donald E. Weder; Joseph G. Straeter, both of Highland; William F. Straeter, Breese, all of Ill.

[73] Assignee: Southpac Trust International Inc., Oklahoma City, Okla.

[*] Notice: The term of this patent shall not extend beyond the expiration date of Pat. No. 5,307,606.

[21] Appl. No.: 673,943

[22] Filed: Jul. 1, 1996

Related U.S. Application Data

[63] Continuation-in-part of Ser. No. 463,905, Jun. 5, 1995, abandoned, which is a continuation of Ser. No. 306,558, Sep. 15, 1994, Pat. No. 5,509,188, which is a continuation of Ser. No. 940,930, Sep. 4, 1992, Pat. No. 5,361,482.

[51] Int. Cl.⁶ .................. B65B 11/00; B65B 43/08
[52] U.S. Cl. .................. 53/397; 53/452; 53/456; 29/469.5; 29/505; 29/525
[58] Field of Search .................. 53/397, 452, 453, 53/456, 580, 558, 559, 563; 29/469.5, 505, 525

[56] References Cited

U.S. PATENT DOCUMENTS

| | | | |
|---|---|---|---|
| D. 314,732 | 2/1991 | Weder | D11/143 X |
| D. 365,305 | 12/1995 | Weder et al. | D11/143 X |
| D. 366,009 | 1/1996 | Weder et al. | D11/143 X |
| D. 366,631 | 1/1996 | Weder et al. | D11/152 X |
| 2,302,259 | 11/1942 | Rothfuss | 41/10 |
| 2,621,142 | 12/1952 | Wetherell | 154/117 |
| 2,648,487 | 8/1953 | Linda | 229/55 |
| 3,376,666 | 4/1968 | Leonard | 47/41 |
| 3,557,516 | 1/1971 | Brandt | 53/14 |
| 4,733,521 | 3/1988 | Weder et al. | 53/580 |
| 4,771,573 | 9/1988 | Stengel | 47/67 |
| 4,773,182 | 9/1988 | Weder et al. | 47/72 |
| 4,801,014 | 1/1989 | Meadows | 206/423 |
| 4,835,834 | 6/1989 | Weder | 29/525 |
| 4,950,216 | 8/1990 | Weder | 47/41.01 X |
| 4,980,209 | 12/1990 | Hill | 428/34.1 |
| 5,029,412 | 7/1991 | Weder et al. | 47/72 |
| 5,111,638 | 5/1992 | Weder | 53/397 |
| 5,181,364 | 1/1993 | Weder | 53/397 |

(List continued on next page.)

FOREIGN PATENT DOCUMENTS

| | | |
|---|---|---|
| 1376047 | 9/1964 | France . |
| 1393725 | 2/1965 | France . |
| 2137325 | 12/1972 | France . |
| 2467796 | 4/1981 | France . |
| 2619698 | 3/1989 | France . |
| 8905250 | 10/1989 | Germany . |
| 1096058 | 12/1967 | United Kingdom . |
| 9003311 | 4/1990 | WIPO . |

OTHER PUBLICATIONS

Ex. A—Color Them Happy with Highlander® Products, ©1922, 2 pages.
Ex. B—Super Seller, Supermarket Floral, Sep. 15, 1992.
Ex. C—Costa Keeps the Christmas Spirit, Supermarket Floral, Sep. 15, 1992.
Ex. D—Now, More Than Ever, Supermarket Floral, Sep. 15, 1992.
Ex. E—Halloween, Link Magazine, Sep. 1992, 2 pages.
Ex. F—Speed Cover® Brochure—The Simple Solution . . . , ©1989.
Ex. G—Speed Sheets and Speed Rolls Brochure, ©1990.

*Primary Examiner*—Linda Johnson
*Attorney, Agent, or Firm*—Dunlap & Codding, P.C.

[57] ABSTRACT

A flower pot cover consisting of a base and a skirt. The base has an upper end, a lower end and a pot receiving space. The skirt is connected to the upper end of the base and the skirt extends a distance outwardly from the base. A bonding material is disposed on the skirt. A flower pot is disposed in the pot receiving space and the portion of the skirt having the bonding material thereon is crimped to provide a bonded crimped portion in the skirt.

27 Claims, 3 Drawing Sheets

U.S. PATENT DOCUMENTS

| | | | |
|---|---|---|---|
| 5,307,606 | 5/1994 | Weder et al. | 53/452 X |
| 5,361,482 | 11/1994 | Weder et al. | 29/469.5 |
| 5,381,642 | 1/1995 | Weder et al. | 47/72 X |
| 5,410,856 | 5/1995 | Weder et al. | 53/397 |
| 5,428,939 | 7/1995 | Weder et al. | 53/397 |
| 5,467,573 | 11/1995 | Weder et al. | 53/397 |
| 5,479,758 | 1/1996 | Weder | 53/456 X |
| 5,493,809 | 2/1996 | Weder et al. | 47/72 |
| 5,509,188 | 4/1996 | Weder et al. | 53/397 X |
| 5,542,169 | 8/1996 | Weder | 29/469.5 |
| 5,566,439 | 10/1996 | Weder | 29/469.5 |
| 5,595,022 | 1/1997 | Weder | 47/72 |
| 5,595,048 | 1/1997 | Weder et al. | 53/399 |
| 5,625,937 | 5/1997 | Weder | 53/397 |

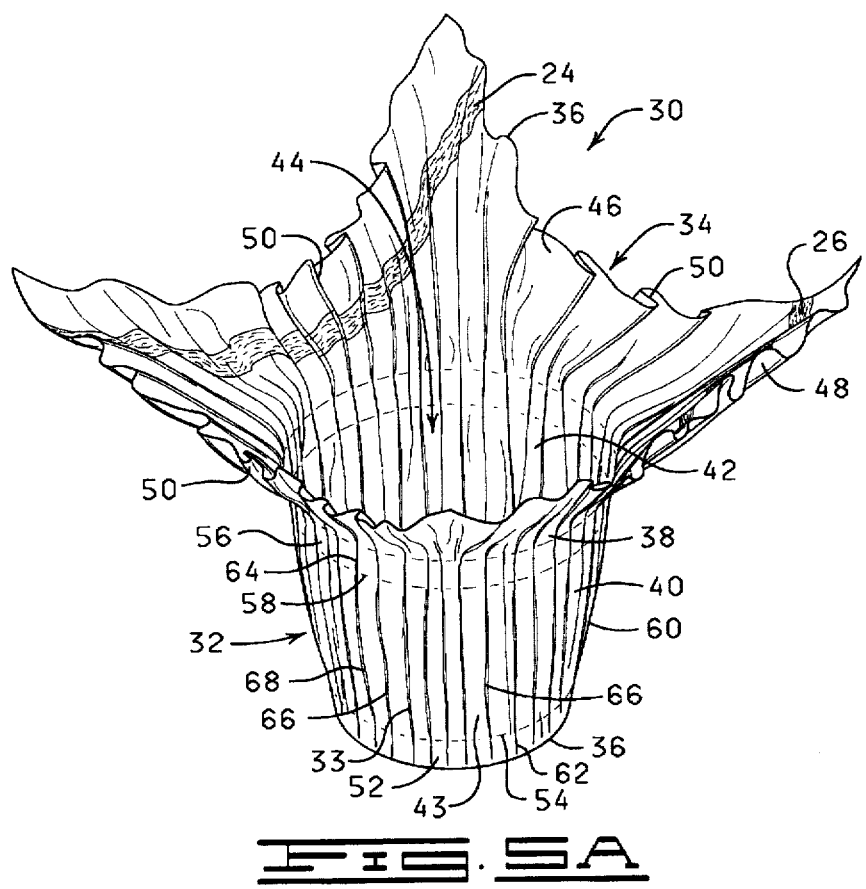
FIG. 5A
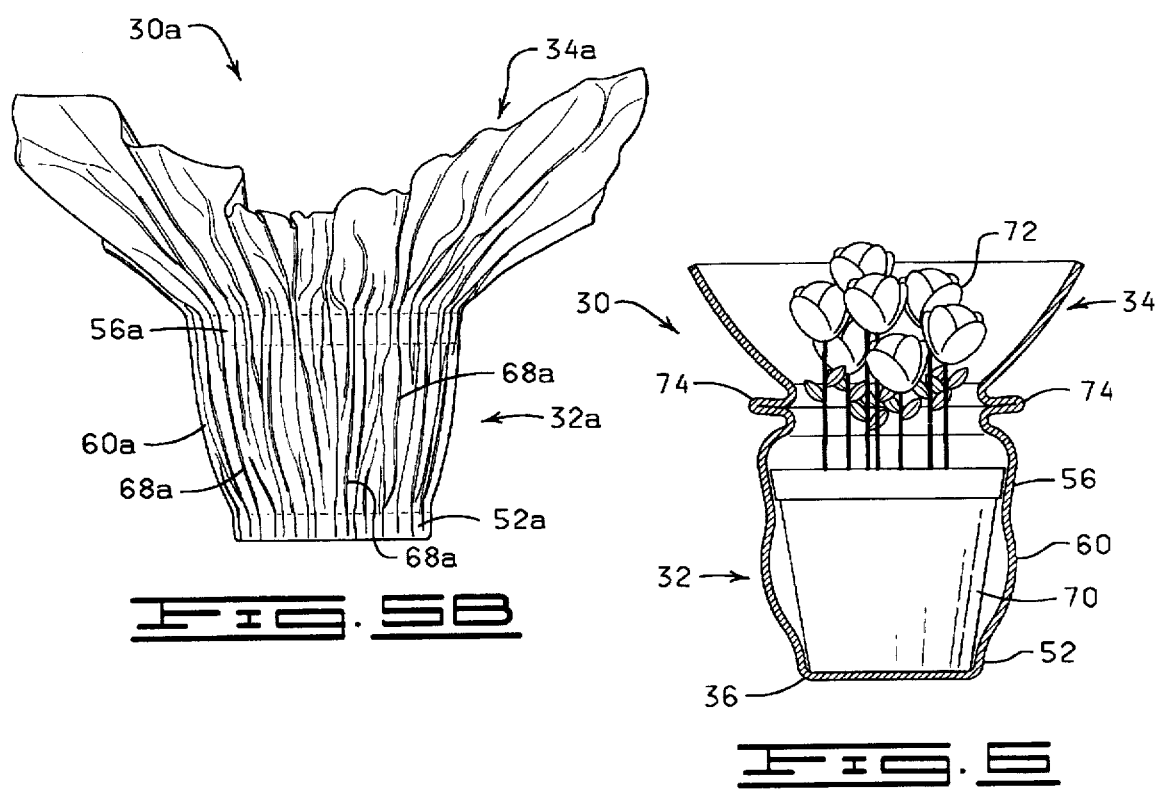
FIG. 5B
FIG. 5

FLOWER POT COVER WITH CRIMPED SKIRT

RELATED REFERENCES

This application is a continuation-in-part of U.S. Ser. No. 08/463,905, filed Jun. 5, 1995, entitled "Flower Pot Cover With Crimped Portion", now abandoned; which is a continuation of U.S. Ser. No. 08/306,558, filed Sep. 15, 1994, entitled "Method of Forming A Flower Pot Cover With Crimped Portion", now U.S. Pat. No. 5,509,188, issued Apr. 23, 1996; which is a continuation of U.S. Ser. No. 07/940,930, filed Sep. 4, 1992, entitled "Method of Forming A Flower Pot Cover With Crimped Portion", now U.S. Pat. No. 5,361,482, issued Nov. 8, 1994.

FIELD OF INVENTION

The present invention relates generally to flower pot covers for providing decorative coverings for flower pots and, more particularly, but not by way of limitation, to a flower pot cover having a bonding material thereon where the skirt portion of the flower pot cover having the bonding material thereon is crimped to provide a crimped portion in the cover.

DESCRIPTION OF THE DRAWINGS

FIG. 5A is a perspective view showing a preformed flower pot cover made in accordance with the present invention.

FIG. 5B is a side perspective view of the cover of FIG. 5A.

FIG. 6 is a sectional view showing the flower pot cover of FIG. 5A disposed about a flower pot with a lateral crimped portion being formed in the flower pot cover.

DESCRIPTION OF THE PREFERRED EMBODIMENTS

Figure 1:
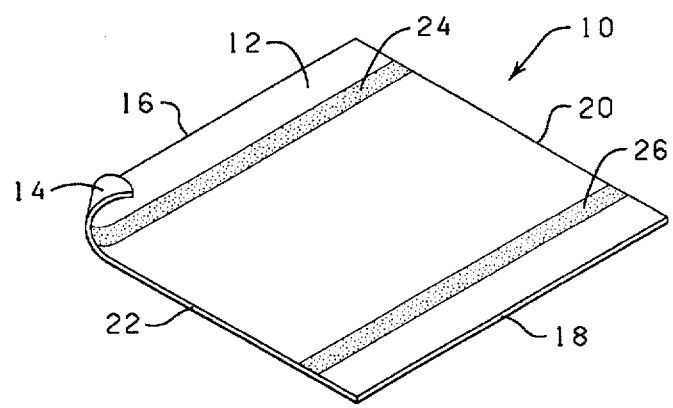
FIG. 1 is a perspective view of a sheet of material used in accordance with the present invention.

Shown in FIG. 1 and designated therein by the general reference numeral 10 is a sheet of material used to form a flower pot cover constructed in accordance with the present invention.

Figure 2:
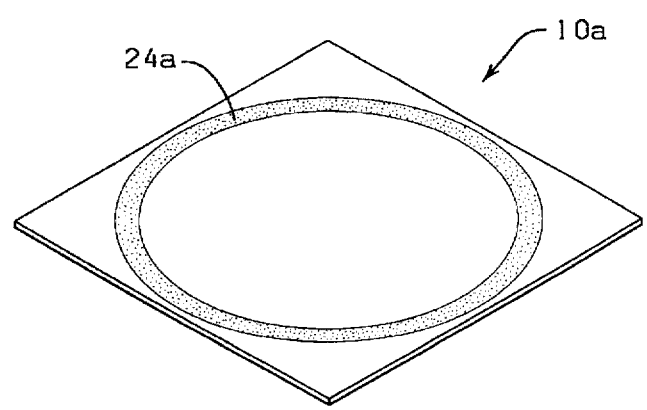
FIG. 2 is a perspective view of another sheet of material which may be used in the present invention.
Figure 3:
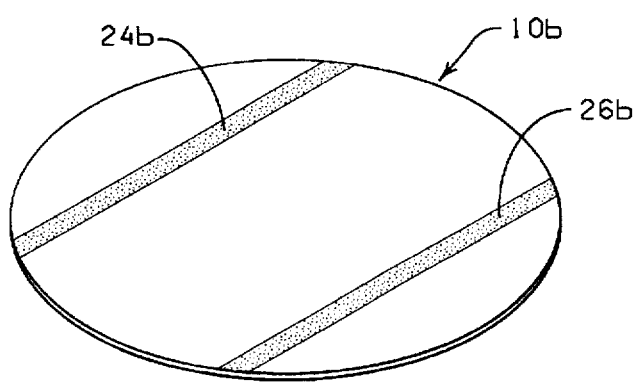
FIG. 3 is a perspective view of yet another sheet of material.
Figure 4:
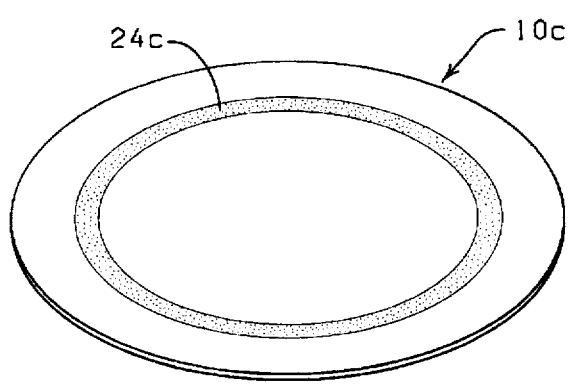
FIG. 4 is a perspective view of still another sheet of material used herein which is constructed in accordance with the present invention.

The sheet of material 10 has a first surface 12, a second surface 14, a first side 16, a second side 18 opposite the first side 16, a third side 20, and a fourth side 22 opposite the third side 20. Disposed upon the first surface 12 is a first strip of bonding material 24, extending from near the third side 20 to the fourth side 22, and a second strip of bonding material 26 also extending from near the third side 20 to the fourth side 22. The strips 24 and 26 are shown as continuous from third side 20 to fourth side 22, but it will be understood by one of ordinary skill in the art that the bonding material of strips 24 and 26 may be interrupted or discontinuous over their lengths. The bonding material strips 24 and 26 may be disposed in different patterns and orientations. For example, shown in FIG. 2 is a sheet of material 10a having a bonding material 24a having a circular pattern. It will also be understood that the sheet of material itself may have a shape other than square or rectangular. For example, the sheet may have a circular shape such as shown in FIGS. 3 and 4. In FIG. 3, a circular sheet of material 10b is shown as having strips of bonding material 24b and 26b. FIG. 4 shows a similarly shaped sheet 10c but with a bonding material strip 24c disposed in a circular pattern. The sheet of material used herein may have any other geometric shape, e.g., trapezoidal, stars, pentagonal, hexagonal, octagonal, or heart-shape, as long as the sheet of material is able to function in accordance with the invention described herein. The bonding material also could be applied to the sheet of material in the form of spaced apart spots or in any other geometric form and in any pattern including covering the entire upper surface 12 or lower surface 14 (or both surfaces 12 and 14) of the sheet of material 10. The term "spot" or "spots" includes any geometric shape of spot including, but not limited to, what is commonly referred to as strips.

In one preferred version of the invention, the sheet of material 10 is used to form a preformed pot cover 30 (shown in FIG. 5) by taking the sheet of material 10 and placing it between a male and a female mold (not shown). The male mold is brought into mating engagement with the female mold thereby forming the pot cover 30 having a base 32 and a skirt 34. In this process, a plurality of overlapping folds are formed in the base 32. The overlapping folds cooperate to maintain the structural integrity of the base 32 and cooperate to maintain the base 32 in the preformed shape. Apparatus and methods for forming a pot cover, as just described, are disclosed in detail in U.S. Pat. No. 4,773,182, titled "Article Forming System", issued Sep. 27, 1988, and in U.S. Pat. No. 5,029,412, issued Jul. 9, 1991, titled "Flower Pot Or Flower Pot Cover With Pleated Skirt And Or Base", the disclosures of which are hereby specifically incorporated herein by reference.

The cover 30 has a base 32 and a skirt 34 which has an outer edge 36. The base 32 has a lower end 36, an upper end 38, an outer surface 40 and an inner surface 42 encompassing a pot receiving space 44.

In a preferred manner, the skirt 34 is formed integrally with the base 32. The skirt 34 is connected to the upper end 38 of the base 32. The skirt 34 has an inner surface 46 and an outer surface 48. In one form, shown in FIG. 5A and 5B, a plurality of folds 50 also are formed in the skirt 34.

In one preferred version of the invention, the base 32 comprises a lower portion 52 extending from the lower end 36 to a line 54 positioned above the lower end 36, an upper portion 56 extending from the upper end 38 to a line 58 positioned below the upper end 38, and a medial portion 60 extending about from line 54 to line 58. The lower portion 52 comprises a portion of the base 32 which has a plurality of connected overlapping folds such as fold 62. The upper portion 56 also comprises a portion of the base 32 which has a plurality of connected overlapping folds such as fold 64. The medial portion 60, disposed between the upper portion 56 and the lower portion 52, comprises a portion of the base 32 having folds 66 which are unconnected, the medial portion 60 of the base 32 thereby left substantially unbonded, thus resulting in a portion of the base 32 having a more billowy appearance in comparison to the flatter appearance of the bonded upper and lower portions 56 and 52. In an alternative version of the invention, the entire base may substantially comprise connected overlapping folds (not shown) or may substantially comprise folds which are unconnected.

The base 32 of cover 30 is shown in FIG. 5A as comprising folds 68 which are substantially vertically oriented along their entire length. Shown in FIG. 5B is an alternative version of the cover, designated by the reference numeral 30a having a base 32a, a skirt 34a, a lower portion 52a, an upper portion 56a, and a medial portion 60a. The cover 30a is basically identical to cover 30 except the folds 68a are more or less randomly oriented directionally rather than uniformly vertically oriented.

Figure 7:
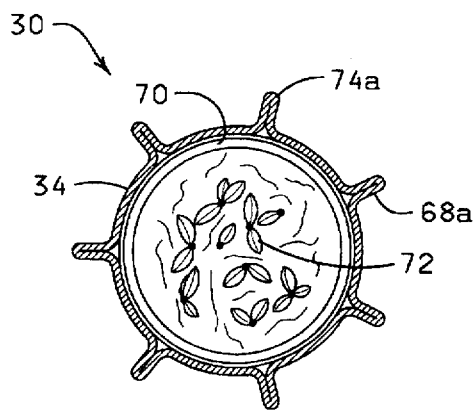
FIG. 7 is a plan view of the pot cover of FIG. 5A having a vertical crimped portion formed in the pot cover.

In accordance with the method of the present invention, a pot such as the one designated in FIG. 6 by reference numeral 70 is disposed within the pot receiving space 44. Typically, the pot 70 contains a plant or floral grouping 72 which extends a distance above the upper end of the pot 70. The pot 70 is substantially surrounded by the base 32. After the pot 70 has been disposed within the base 32, the skirt 34 is crimped about the floral grouping 72. The crimped portion, shown in FIG. 6, is designated by the reference numeral 74 and is formed in the skirt 34 of cover 30 by pinching together portions of the skirt 34 in the vicinity of the bonding material 24 or 26 so that the overlapping portions of the skirt 34 are bondingly connected together in a position above the upper end of the pot 70 and around the floral grouping 72, thereby assisting in securing the cover 30 in a position about the pot 70 and plant 72. In FIG. 6, the crimped portion 74 is positioned laterally about the skirt 34, and extends outwardly away from the plant 72. The crimped portion 74 may extend continuously laterally about the skirt 34, or may be discontinuous. Alternatively, a crimped portion may be formed so that the overlapped portions are vertically oriented, such as the crimped portion 74a shown in the cover 30 in FIG. 7.

The crimping step may be conducted before the pot is disposed within the flower pot cover, or the crimping step may be conducted after the flower pot is disposed within the cover by crimping the skirt 34 in the area of the bonding material 24 or 26. Such crimping may be conducted by hand, by grasping portions of the skirt 34 having the bonding material thereon, in the area of the bonding material 24 or 26, and squeezing those portions together about the area of the bonding material 24 or 26, thereby pressing and gathering the sheet of material into bonding engagement therewith. The skirt 34 may also be crimped by using both a crimping motion and a turning motion to create a twisted crimping (not shown), resulting in a cover which is both crimped, as described previously, and which is twisted about a lower portion of the floral grouping within the pot near the stem end being rotated between about one-eighth of a turn to about a full turn primarily in the area near the stem end of the floral grouping. Such crimping as described above may also be conducted by any instrument or machine used for gathering or crimping materials.

Figure 8:
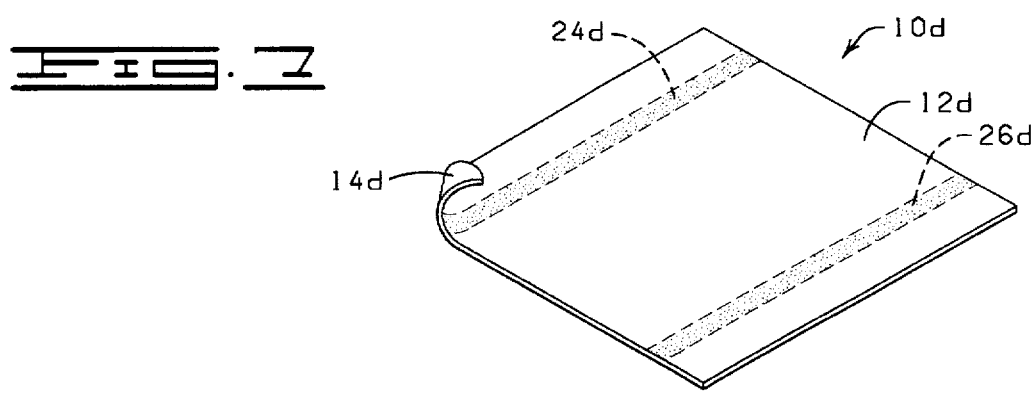
FIG. 8 is a perspective view of a sheet of material having a bonding material on the downwardly facing (outside) side of the sheet.
Figure 9:
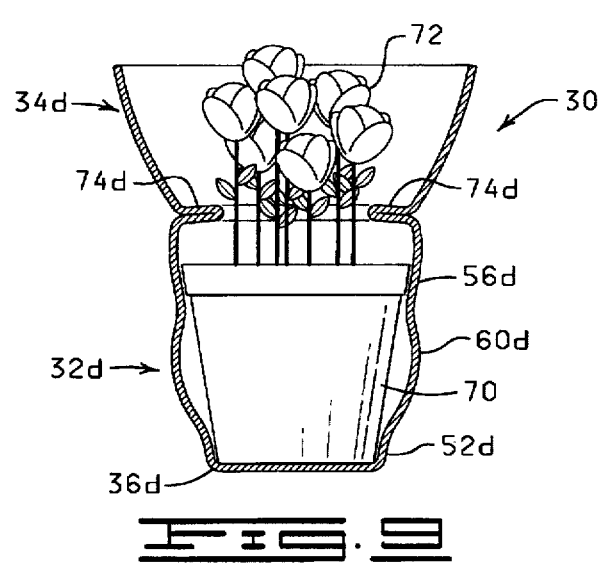
FIG. 9 is a sectional view of a pot cover formed from the sheet of FIG. 8 with a lateral crimped portion formed therein.
Figure 10:
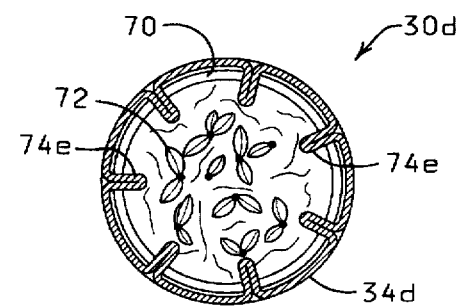
FIG. 10 is a plan view of the pot cover of FIG. 9 but instead having a vertical crimped portion.

In an alternative version of the invention, a cover is formed from a sheet of material 10d, such as shown in FIG. 8, having an upper surface 12d and a lower surface 14d and which has a first strip of bonding material 24d and a second sheet of bonding material 26d, both of which are disposed on the lower surface 14d of the sheet 10d. When a cover is formed from a sheet such as sheet 10d, the bonding material is disposed on an outer surface of the skirt of the cover. Shown in FIG. 9 is a cover formed in such a way. The cover is designated by the reference numeral 30d and comprises a base 32a, a skirt 34d, a lower portion 52d in the base, an upper portion 56d in the base and a medial portion 60d. Since the bonding material is disposed on the outer surface of the preformed cover, the crimped portion 74d which is formed is oriented in an inward direction toward the plant and extends laterally about the plant. In an alternative method of forming the crimped portion in the cover 30d, portions of the skirt 34d may be crimped so that they are oriented in an upwardly oriented direction, such as the crimped portions 74e shown in FIG. 10. The crimped portions 74d of the cover 30d in FIG. 9 may extend continuously about the skirt 34d or may be discontinuous.

The bonding material 24 and 26 may be applied to the sheet of material prior to forming the sheet of material 10 into the flower pot cover 30 or the bonding material 24 and 26 may be applied during the forming of the sheet of material 10 into the flower pot cover 30 or the bonding material 24 and 26 may be applied after the flower pot cover 30 has been formed.

In another version of the invention, any of the pot covers described herein may further include a bonding material (not shown) disposed on a portion of the inner surface 42 of the base 32 for bonding the base 32 of the cover 30 (or other covers described herein) to the outer surface of the pot 70.

In other instances, the bonding material on the inner surface of the base 32 may be a cohesive. In such a case, a cohesive material also is included on the outer peripheral surface of the flower pot 70 for bondingly engaging with the cohesive bonding material on the flower pot cover 30.

Preferably, the sheet of material 10 used in accordance with the present invention is constructed from a material selected from the group of materials consisting of paper (treated or untreated), cellophane, foil, polymer film, fabric (natural or synthetic, woven or nonwoven), or burlap or combinations or laminations thereof.

The term "polymer film" means a man-made polymer such as a polypropylene or a naturally occurring polymer such as cellophane. A polymer film is relatively strong and not as subject to tearing (substantially non-tearable), as might be the case with paper or foil.

The sheet of material 10 or other embodiments described herein may vary in color. Further, the sheet of material may consist of designs or decorative patterns which are printed, etched, and/or embossed thereon using inks or other printing materials. An example of an ink which may be applied to the surface of the sheets of material described herein is described in U.S. Pat. No. 5,147,706, entitled "Water Based Ink On Foil And/Or Synthetic Organic Polymer" issued to Kingman on Sep. 15, 1992 and which is hereby incorporated herein by reference. In addition, the sheets of material described herein may have various colorings, coatings, flocking and/or metallic finishes, or other decorative surface ornamentation applied separately or simultaneously or may be characterized totally or partially by pearlescent, translucent, transparent, iridescent or the like, qualities. Each of the above-named characteristics may occur alone or in combination and may be applied to the upper and/or lower surface of the sheets of material described herein. Moreover, each surface of the sheets of material described herein may vary in the combination of such characteristics. The sheets of material described herein may be opaque, translucent or partially clear or tinted transparent.

The material has a thickness in a range from about 0.1 mils to about 30 mils. Preferably, the material has a thickness in a range from about 0.1 mils to about 5 mils.

The sheets of material described herein may be constructed of a single layer of material or a plurality of layers of the same different types of materials. Any thickness of the sheet of material may be utilized in accordance with the present invention as long as the sheet of material is formable into a preformed pot cover with a skirt, as described herein. The layers of material comprising the sheet of material may be connected together or laminated or may be separate layers, and the layers of material comprising the sheet of material need not be uniform in shape or composition.

As noted above, the sheet of material may be constructed of a single layer of material or a plurality of layers of the same or different types of materials. Any thickness of the sheet of material may be utilized in accordance with the present invention as long as the sheet of material may be formed into a flower pot cover, as described herein. Additionally, an insulating material such as bubble film, preferable as one of two or more layers, can be utilized in order to provide additional protection for the item wrapped therein.

In a preferred embodiment, the sheet of material 10 is constructed from two polypropylene films (a 20"×15" sheet of Mobil 270 ABW white opaque film laminated to a 20"×15" sheet of Mobil 220 AB clear film) having a thickness in a range of from less than about 1.0 mil to about 2.5 mils. The layers of material comprising the sheet of material may be connected together or laminated or may be separate layers.

A decorative pattern, such as a color and/or an embossed pattern, and/or other decorative surface ornamentation may be applied to the inner peripheral surface and/or the outer peripheral surface of the sheet or cover or portions thereof including, but not limited to printed design, coatings, colors, flocking or metallic finishes. The sheet of material also may be totally or partially clear or tinted transparent material.

The term "bonding material" when used herein means an adhesive, preferably a pressure sensitive adhesive, or a cohesive. Where the bonding material is a cohesive, a similar cohesive material must be placed on the adjacent surface for bondingly contacting and bondingly engaging with the cohesive material. The term "bonding material" also includes material which are heat sealable and, in this instance, the adjacent portions of the material must be brought into contact and then heat must be applied to effect the seal. The term "bonding material" also includes materials which are sonic sealable and vibratory sealable. The term "bonding material" when used herein also means a heat sealing lacquer which may be applied to the sheet of material and, in this instance, heat, sound waves, or vibrations, also must be applied to effect the sealing.

The bonding material on the skirt may be selected from the group consisting of a pressure sensitive adhesive or cohesive, a heat sensitive adhesive or cohesive, a sonically sealable adhesive or cohesive, a vibratingly sealing adhesive or cohesive, or a chemically sealing adhesive or cohesive.

The sheet of material used herein may further comprise at least one scent (not indicated in the figures). Examples of scents utilized herein include (but are not limited to) floral scents (flower blossoms, or any portion of a plant), food scents (chocolate, sugar, fruits), or herb or spice scents (cinnamon), and the like. Additional examples of scents include flowers (such as roses, daisies, lilacs), plants (such as fruits, vegetables, grasses, trees), foods (for example, candies, cookies, cake), food condiments (such as honey, sugar, salt), herbs, spices, woods, roots, and the like, or any combination of the foregoing. Such scents are known in the art, and are commercially available.

The scent may be disposed upon the sheet of material 10 by spraying the scent thereupon, painting the scent thereupon, brushing the scent thereupon, lacquering the scent thereupon, immersing the sheet of material in a scent-containing liquid, exposing the sheet of material to scent-containing gas, or any combination thereof.

The scent may be contained within a lacquer, or other liquid, before it is disposed upon the sheet of material 10. The scent may also be contained within a dye, ink, and/or pigment (not shown). Such dyes, inks and pigments are known in the art, and are commercially available, and may be disposed upon or incorporated in the sheet of material 10 by any method described herein or known in the art.

The term plant or "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "floral grouping" where used herein, means cut fresh flowers, artificial flowers, a single flower, other fresh and/or artificial plants or other floral materials and may include other secondary plants and/or ornamentation or artificial or natural materials which add to the aesthetics of the overall floral arrangement. The floral grouping comprises a bloom or foliage portion and a stem portion. However, it will be appreciated that the floral grouping may consist of only a single bloom or only foliage (not shown). The term "floral grouping" may be used interchangeably herein with the term "floral arrangement"

Changes may be made in the construction and the operation of the various components, elements and assemblies described herein or in the steps or the sequence of steps of the methods described herein without departing from the spirit and scope of the invention as defined in the following claims.

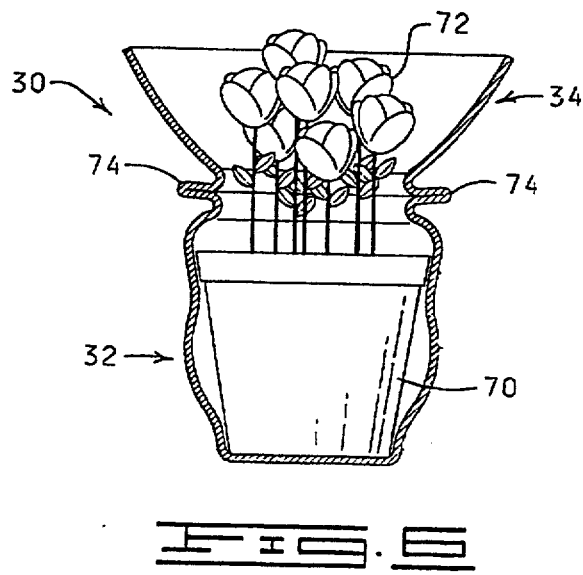

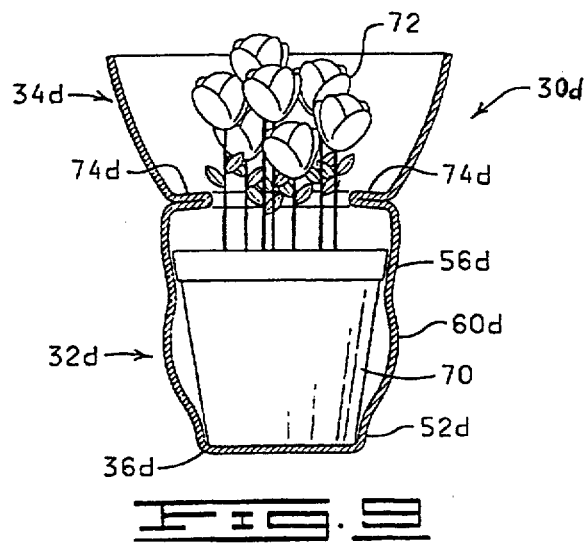

What is claimed is:

1. A method for providing a cover disposable about a pot means, comprising:

providing a preformed base having an upper end, a lower end, an outer peripheral surface and a pot receiving space, and a skirt connected to the upper end of the base and extending a distance from the upper end of the base terminating with an outer edge, the skirt having an outer surface and an inner surface, a bonding material being disposed on a portion of the skirt;

providing a pot means having an upper end and a lower end;

disposing the pot means in the pot receiving space of the preformed base; and crimping together portions of the skirt having the bonding material thereon wherein the bonding material causes the portions of the skirt which are crimped together to be bonded together forming a crimped portion above the upper end of pot means.

2. The method of claim 1 wherein the step of forming the crimped portion is defined further as forming the crimped portion extending at least partially circumferentially about the cover.

3. The method of claim 1 wherein in the step of providing the preformed base the bonding material is disposed on the inner surface of the skirt.

4. The method of claim 1 wherein in the step of providing the preformed base the bonding material is disposed on the outer surface of the skirt.

5. The method of claim 1 wherein the step of forming the crimped portion is defined further as forming the crimped portion extending a distance radially inwardly above the upper end of the pot means.

6. The method of claim 1 wherein the crimped portion is discontinuous about the upper end of the pot.

7. The method of claim 1 wherein the bonding material is selected from the group consisting of pressure sensitive adhesives or cohesives, heat sensitive adhesives or cohesives, sonically sealable adhesives or cohesives, vibratingly sealable adhesives or cohesives, chemically sealing adhesives or cohesives, or cold sealing adhesives or cohesives.

8. The method of claim 1 wherein in the step of providing a preformed base, the base has a lower portion having overlapping folds which are bonded together, a medial portion having folds which are unbonded, and an upper portion which has overlapping folds which are bonded together.

9. The method of claim 1 wherein in the step of providing a preformed base, the bonding material comprises at least two spaced apart strips on a portion of the inner surface of the skirt.

10. The method of claim 1 wherein in the step of providing a preformed base, the base has a bonding material disposed upon a portion thereof for bonding the base to the pot thereof for bonding the base to the pot means disposed therein.

11. A method for providing a cover disposable about a pot means having an upper end and a lower end, comprising:

provproviding a preformed base having an upper end, a lower end, an outer peripheral surface and a skirt connected to the upper end of the base, and extending a distance from the upper end of the base terminating with an outer edge, the skirt having an outer surface and an inner surface, a bonding material being disposed on a portion of the skirt;

crimping together portions of the skirt having the bonding material thereon wherein the bonding material causes the portions of the skirt which are crimped together to be bonded together forming a crimped portion; and disposing a pot means in the pot receiving space of the base wherein the crimped portion is positioned above the upper end of the pot means.

12. The method of claim 11 wherein in the step of providing the crimped portion is defined further as forming the crimped portion extending circumferentially about the cover.

13. The method of claim 11 wherein in the step of providing the preformed base the bonding material is disposed on the inner surface of the skirt.

14. The method of claim 11 wherein the crimped portion is discontinuous about the upper end of the pot.

15. The method of claim 11 wherein the bonding material is selected from the group consisting of pressure sensitive adhesives or cohesives, heat sensitive adhesives or cohesives, sonically sealable adhesives or cohesives, vibratingly sealable adhesives or cohesives, chemically sealing adhesives or cohesives, or cold sealing adhesives or cohesives.

16. The method of claim 11 wherein in the step of providing a preformed base, the base has a lower portion having overlapping folds which are bonded together, a medial portion having folds which are unbonded, and an upper portion which has overlapping folds which are bonded together.

17. The method of claim 11 wherein in the step of providing a preformed base, the bonding material comprises at least two spaced apart strips on a portion of the inner surface of the skirt.

18. The method of claim 11 wherein in the step of providing a preformed base, the base has a bonding material disposed upon a portion thereof for bonding the base to the pot thereof for bonding the base to the pot means disposed therein.

19. A method for providing a cover for a pot means having an upper end, a lower end and an outer peripheral surface, comprising:

providing a preformed base having an upper end and the base having a lower portion having at least some connected overlapping folds, a medial portion substantially free of connected overlapping folds, and an upper portion having at least some connected overlapping folds, the base further comprising an outer surface and a pot receiving space, and the base having a skirt extending a distance from the upper end of the base, the skirt having an inner surface and an outer surface and having a bonding material disposed upon a portion of the inner surface thereof;

disposing a pot means into the pot receiving space of the base; and crimping together portions of the skirt above the upper end of the pot means having the bonding material thereon wherein the bonding material causes portions of the skirt which are crimped together to be bonded together forming a crimped portion.

20. The method of claim 19 wherein the step of forming the crimped portion is defined further as forming the crimped portion extending at least partially circumferentially about the cover.

21. The method of claim 19 wherein the crimped portion is discontinuous about the upper end of the pot.

22. The method of claim 19 wherein the bonding material is selected from the group consisting of pressure sensitive adhesives or cohesives, heat sensitive adhesives or cohesives, sonically sealable adhesives or cohesives, vibratingly sealable adhesives or cohesives, chemically sealing adhesives or cohesives, or cold sealing adhesives or cohesives.

23. The method of claim 19 wherein in the step of providing a preformed base, the bonding material comprises at least two spaced apart strips on a portion of the inner surface of the skirt.

24. The method of claim 19 wherein in the step of providing a preformed base, the base has a bonding material disposed upon a portion thereof for bonding the base to the pot means disposed therein.

25. A method for providing a covering disposable about a pot means, comprising:

providing a preformed cover having an upper end, a lower end, an outer peripheral surface and a pot receiving space, and having an adhesive or cohesive bonding material disposed on a portion of the preformed cover;

providing a pot means having an upper end and a lower end;

disposing the pot means in the pot receiving space of the preformed cover; and crimping together portions of the preformed cover having the bonding material thereon wherein the bonding material causes the portions of the preformed cover which are crimped together to be bonded together forming a crimped portion in a position above the upper end of pot means.

26. A method for providing a cover disposable about a pot means having an upper end and a lower end, comprising:

providing a preformed cover having an upper end, a lower end, an outer peripheral surface and having an adhesive or cohesive bonding material disposed on a portion of the preformed cover;

crimping together portions of the preformed cover having the bonding material thereon wherein the bonding material causes the portions of the preformed cover which are crimped together to be bonded together forming a crimped portion; and disposing a pot means in the pot receiving space of the preformed cover wherein the crimped portion is positioned above the upper end of the pot means.

27. A method for providing a cover for a pot means having an upper end, a lower end and an outer peripheral surface, comprising:

providing a preformed cover having an upper end and a lower end and the cover having a medial portion substantially free of connected overlapping folds, a lower portion below the medial portion having at least some connected overlapping folds, and an upper portion above the medial portion having at least some connected overlapping folds, the cover further comprising an outer surface, an inner surface, and a pot receiving space, and the cover having an adhesive or cohesive bonding material disposed upon a portion of the inner or outer surface thereof;

disposing a pot means into the pot receiving space of the preformed cover; and crimping together portions of the cover above the upper end of the pot means wherein the adhesive or cohesive bonding material causes portions of the preformed cover which are crimped together to be bonded together forming a crimped portion.

* * * * *

UNITED STATES PATENT AND TRADEMARK OFFICE
CERTIFICATE OF CORRECTION

PATENT NO : 5,715,650  Page 1 of 3
DATED : February 10, 1998
INVENTOR(S) : Donald E. WEDER et al.

It is certified that error appears in the above-identified patent and that said Letters Patent is hereby corrected as shown below:

In the Drawings:

Fig. 5A: delete "36" designating the "outer edge" and substitute --35-- therefor; delete reference numerals "33" and "43";

Fig. 6: delete reference numerals "36", "52", "60" and "56";

Fig. 9: delete the reference numeral "30" and substitute --30d-- therefor;

Col. 2: line 47, delete "36" and substitute --35-- therefor;

Col. 3: line 65, delete "sheet" and substitute --strip-- therefor;

Col. 4: line 4, delete "32a" and substitute --32d-- therefor;
line 9, after "plant", insert --72-- before the ".";
line 66, delete the first occurrence of "mils" and substitute --mil-- therefor;
line 67, delete the first occurrence of "mils" and substitute --mil-- therefor;

Col. 5: line 3, between "same" and "different" insert the word --or--;
line 42, delete "material" and substitute --materials-- therefor;

Col. 7: line 54 (line 14 of claim 11), delete "the" and substitute --a-- therefor;
line 57 (line 1 of claim 12), after "wherein", delete "in"; and Col. 9: line 22 (line 12 of claim 26), delete "the" and substitute --a-- therefor.

UNITED STATES PATENT AND TRADEMARK OFFICE
CERTIFICATE OF CORRECTION

PATENT NO : 5,715,650  
DATED : February 10, 1998  
INVENTOR(S): Donald E. WEDER et al.

It is certified that error appears in the above-identified patent and that said Letters Patent is hereby corrected as shown below:

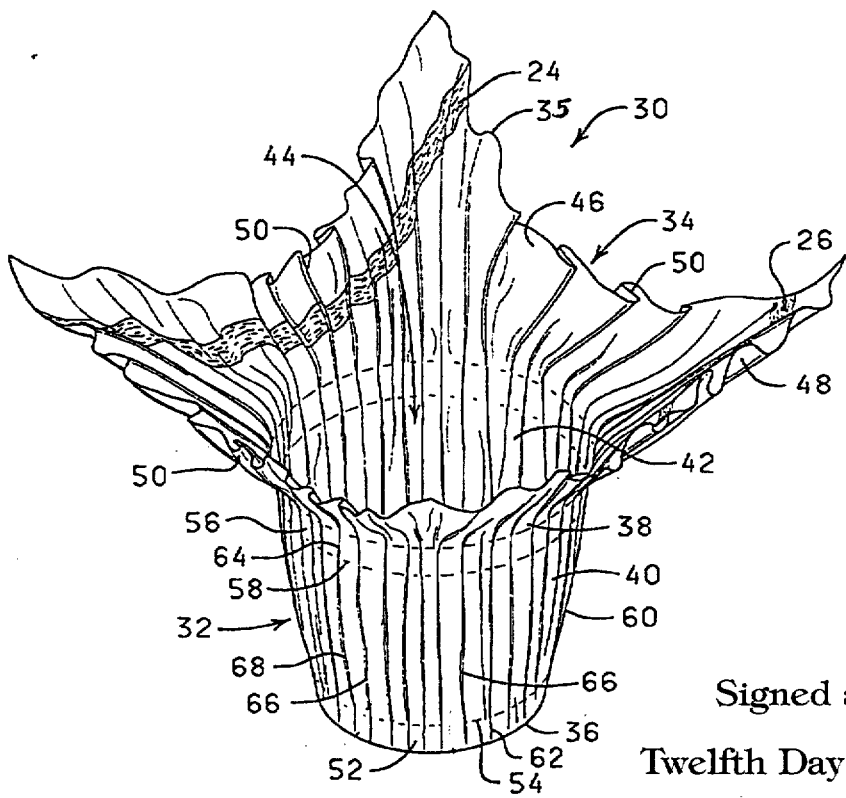

Signed and Sealed this

Twelfth Day of September, 2000

*Attest:*

Q. TODD DICKINSON

*Attesting Officer*     *Director of Patents and Trademarks*

UNITED STATES PATENT AND TRADEMARK OFFICE
CERTIFICATE OF CORRECTION

PATENT NO : 5,715,650
DATED : February 10, 1998
INVENTOR(S): Donald E. WEDER et al.

It is certified that error appears in the above-identified patent and that said Letters Patent is hereby corrected as shown below: